(12) United States Patent
Nawaz et al.

(10) Patent No.: US 10,955,525 B2
(45) Date of Patent: Mar. 23, 2021

(54) DATA ACQUISITION METHOD AND APPARATUS FOR FMCW RADAR SYSTEM

(71) Applicant: NXP USA, INC., Austin, TX (US)

(72) Inventors: Muhammad Saad Nawaz, Munich (DE); Ralf Reuter, Landshut (DE)

(73) Assignee: NXP USA, INC., Austin, TX (US)

( * ) Notice: Subject to any disclaimer, the term of this patent is extended or adjusted under 35 U.S.C. 154(b) by 210 days.

(21) Appl. No.: 16/145,801

(22) Filed: Sep. 28, 2018

(65) Prior Publication Data

US 2019/0178986 A1 Jun. 13, 2019

(30) Foreign Application Priority Data

Dec. 12, 2017 (EP) .................................... 17206839

(51) Int. Cl.
| | | |
|---|---|---|
| *G01S 7/35* | (2006.01) | |
| *G01S 13/931* | (2020.01) | |
| *G01S 13/58* | (2006.01) | |
| *G01S 13/06* | (2006.01) | |
| *G01S 13/50* | (2006.01) | |
| *G01S 13/34* | (2006.01) | |

(52) U.S. Cl.
CPC ............ *G01S 7/352* (2013.01); *G01S 13/06* (2013.01); *G01S 13/343* (2013.01); *G01S 13/345* (2013.01); *G01S 13/50* (2013.01); *G01S 13/584* (2013.01); *G01S 13/931* (2013.01)

(58) Field of Classification Search
CPC ........ G01S 13/345; G01S 13/931; G01S 7/35; G01S 7/4056; G01S 13/34; G01S 13/42; G01S 2007/356; G01S 7/354; G01S 13/06; G01S 13/343; G01S 7/352; G01S 7/52028; G01S 13/584; G01S 13/50; G06K 7/10019; H04B 1/16; H04B 1/0045; H04L 1/0045; H01Q 1/3233
See application file for complete search history.

(56) References Cited

U.S. PATENT DOCUMENTS

| | | | |
|---|---|---|---|
| 5,625,362 A | 4/1997 | Richardson | |
| 6,014,336 A * | 1/2000 | Powell | G01R 31/30 365/201 |

(Continued)

OTHER PUBLICATIONS

Kronauge, M., "Radar Target Detection and Doppler Ambiguity Resolution", 11th International Radar Symposium, IEEE Jun. 16-18, 2010.

*Primary Examiner* — Olumide Ajibade Akonai

(57) ABSTRACT

A method and apparatus for acquiring chirp data in a frequency modulated continuous wave (FMCW) radar system of a road vehicle. The method includes transmitting a FMCW signal comprising a plurality of ramping regions in which a frequency of the FMCW signal ramps up to a first frequency or ramps down to a second frequency. The method also includes receiving a reflected signal corresponding to the reflection of the FMCW signal from one or more physical objects. The reflected signal includes a plurality of ramping regions corresponding to the ramping regions of the transmitted FMCW signal. The method further includes sampling the reflected signal by: taking a plurality of samples in a ramping region in which the frequency of the reflected signal ramps up; and taking a plurality of samples in a ramping region in which the frequency of the reflected signal ramps down.

20 Claims, 7 Drawing Sheets

(56) References Cited

U.S. PATENT DOCUMENTS

| | | | |
|---|---|---|---|
| 6,018,309 A * | 1/2000 | Mitsumoto | G01S 13/343 |
| | | | 342/109 |
| 8,026,843 B2 * | 9/2011 | Winkler | G01S 7/4008 |
| | | | 342/109 |
| 9,835,723 B2 | 12/2017 | Jansen et al. | |
| 9,853,365 B2 | 12/2017 | Kumar et al. | |
| 10,012,726 B2 | 7/2018 | Schoor et al. | |
| 10,473,757 B2 * | 11/2019 | Mckitterick | G01S 13/343 |
| 2011/0234448 A1 * | 9/2011 | Hayase | G01S 13/345 |
| | | | 342/70 |
| 2012/0229323 A1 * | 9/2012 | Kato | G01S 13/345 |
| | | | 342/27 |
| 2015/0168547 A1 | 6/2015 | Lee et al. | |
| 2016/0097671 A1 | 4/2016 | Faber et al. | |
| 2019/0094338 A1 * | 3/2019 | Fischer | G01S 13/931 |
| 2020/0241110 A1 * | 7/2020 | Breddermann | G01S 13/42 |

* cited by examiner

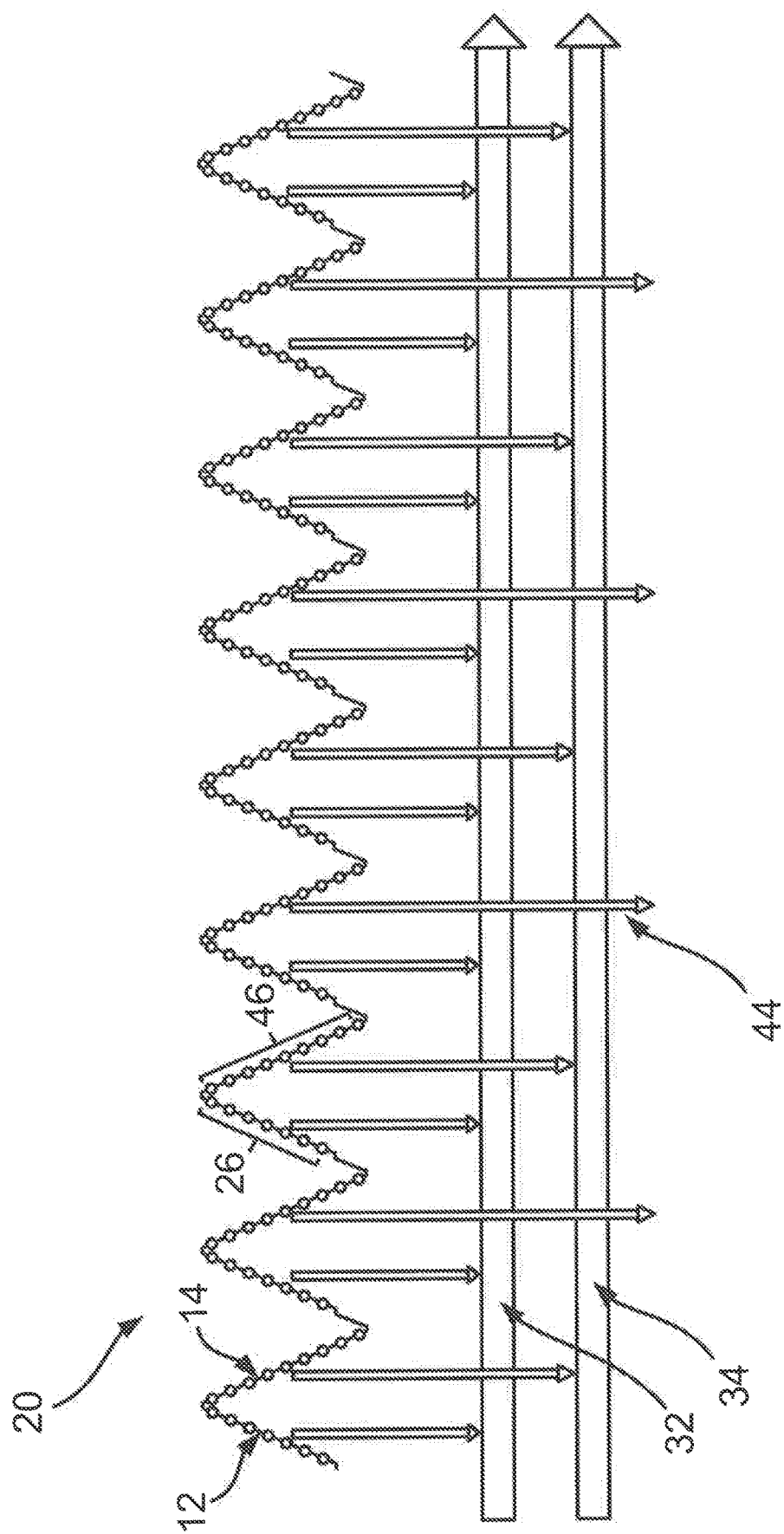

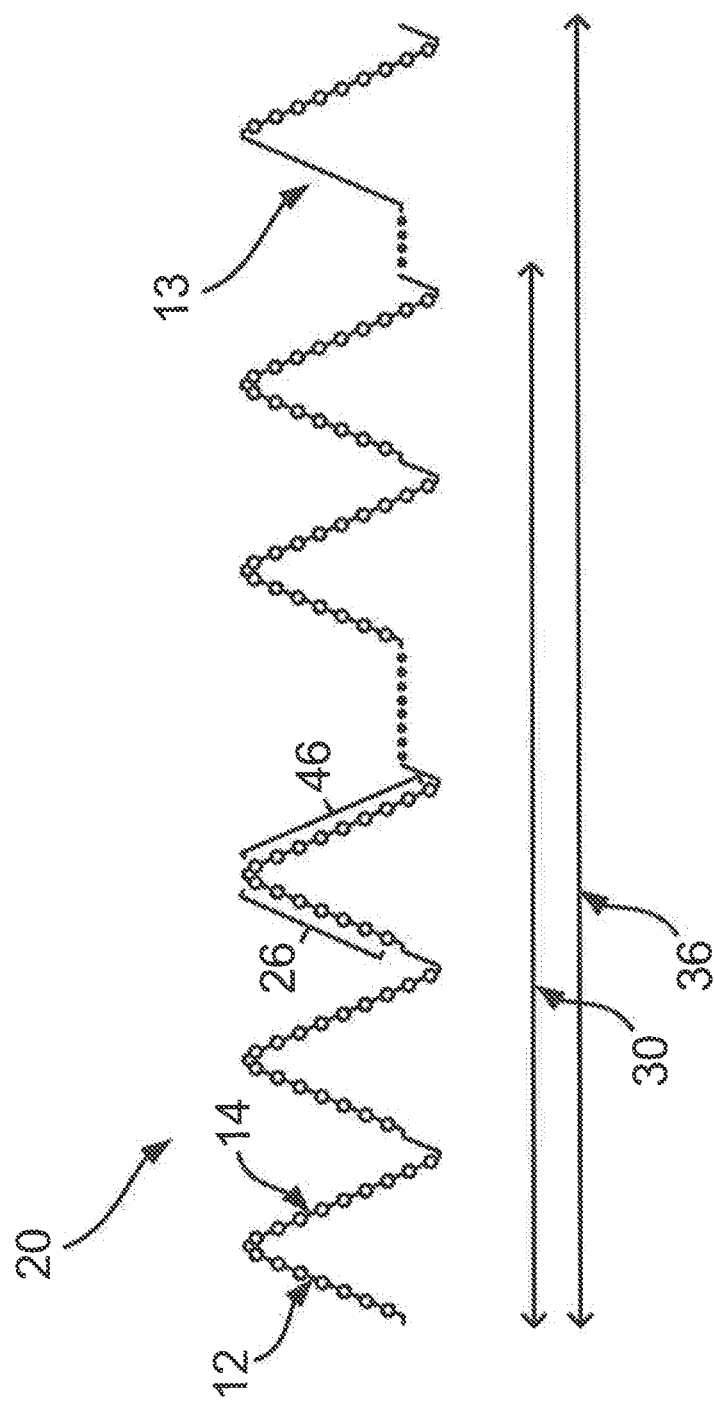

DATA ACQUISITION METHOD AND APPARATUS FOR FMCW RADAR SYSTEM

CROSS-REFERENCE TO RELATED APPLICATIONS

This application claims the priority under 35 U.S.C. § 119 of European Patent application no. 17206839.7, filed on 12 Dec. 2017, the contents of which are incorporated by reference herein.

BACKGROUND

The present specification relates to a data acquisition apparatus and method for frequency modulated continuous wave (FMCW) radar.

Conventional methods for the acquisition of chirp data in a FMCW radar system have high overhead time (to return to the start frequency) between two chirp data acquisitions. Additionally, in signal processing techniques such as ambiguity resolution, the number of chirps generally needs to be doubled, hence doubling the total frame acquisition time. Similarly the acquisition overhead becomes more than half total acquisition time. This reduces the radar update rate (frame repetition rate) and can result in poor performance.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a method of acquiring chirp data in a frequency modulated continuous wave (FMCW) radar system of a road vehicle, the method comprising:

transmitting a frequency modulated continuous wave signal comprising a plurality of ramping regions in which a frequency of the frequency modulated continuous wave signal ramps up to a first frequency or ramps down to a second frequency;

receiving a reflected signal corresponding to the reflection of the frequency modulated continuous wave signal from one or more physical objects, wherein the reflected signal includes a plurality of ramping regions corresponding to the ramping regions of die transmitted frequency modulated continuous wave signal;

sampling the reflected signal by:
taking a plurality of samples in a ramping region in which the frequency of the reflected signal ramps up; and
taking a plurality of samples in a ramping region in which the frequency of the reflected signal ramps down.

According to another aspect of the present disclosure, there is provided a data acquisition apparatus for a frequency modulated continuous wave (FMCW) radar system of a road vehicle, the apparatus comprising:

a receiver for receiving a reflected signal corresponding to the reflection of a transmitted frequency modulated continuous wave signal from one or more physical objects, wherein the reflected signal includes a plurality of ramping regions corresponding to ramping regions of the transmitted signal, wherein the ramping regions are regions in which a frequency of the frequency modulated continuous wave signal ramps up to a first frequency or ramps down to a second frequency; and a sampler configured to sample the reflected signal by:
taking a plurality of samples in a ramping region of the reflected signal in which the frequency of the reflected signal ramps up; and
taking a plurality of samples in a ramping region of the reflected signal in which the frequency of the reflected signal ramps down.

By sampling the reflected signal both in ramping regions in which the frequency of the reflected signal ramps up and in which the frequency of the reflected signal ramps down, chirp data may swiftly be acquired in a FMCW radar system.

Typically, the ramping of the frequency in the ramping regions may take place between the first and the second frequencies. That is to say that in ramping regions in which the frequency ramps up, the frequency may start at the second frequency and ramp up to the first frequency, whereas in ramping regions in which the frequency ramps down, the frequency may start at the first frequency and ramp down to the second frequency.

The sampling may differ according to the type of ramping region. In one embodiment, the sampling may include taking a greater number of samples in the ramping region in which the frequency of the reflected signal ramps up than in the ramping region in which the frequency of the reflected signal ramps down. In another embodiment, the sampling may include taking a greater number of samples in the ramping region in which the frequency of the reflected signal ramps down than in the ramping region in which the frequency of the reflected signal ramps up. The sampler may be configured to take a greater number of samples in either type of ramping region.

The sampling may include taking substantially the same number of samples in the ramping region in which the frequency of the reflected signal ramps up as in the ramping region in which the frequency of the reflected signal ramps down.

The sampled data may be conveyed for processing in one or more data streams. These data streams may be provided in separate paths of the apparatus. In one embodiment, the method may include forming a first data stream comprising data sampled from a plurality of the ramping regions in which the frequency of the reflected signal ramps up, and forming a second, data stream comprising data sampled from a plurality of said ramping regions in which the frequency of the reflected signal ramps down. The data streams may be separate. This may conveniently allow for separate processing of the sampling data according to the type of ramping region the sampling occurred in.

The method may include periodically skipping the inclusion in the first data stream of data sampled in a ramping region of the ramping regions in which the frequency of the reflected signal ramps up. Additionally, or alternatively, the method may include periodically skipping the inclusion in the second data stream of data sampled in a ramping region of the ramping regions in which the frequency of the reflected signal ramps down. The method may include applying a signal processing algorithm for resolving ambiguous velocities to the sampled data in the first data stream and the second data stream.

The method may include sampling the reflected signal by: taking a plurality of samples in a plurality of ramping regions in which the frequency of the reflected signal ramps up; taking a plurality of samples in a plurality of ramping regions in which the frequency of the reflected signal ramps down; and not taking any samples in one or more ramping regions of the reflected signal in which the frequency of the reflected signal ramps up, or not taking any samples in one or more ramping regions of the reflected signal in which the frequency of the reflected signal ramps down. In this way, variability may be introduced in total frame length between ramping regions in which the frequency ramps up and ramping regions in which the frequency ramps down.

The ramping regions in which samples are not taken may be located at a start or at an end of a frame comprising a plurality of ramping regions.

The physical objects may, for example, be at least one other road vehicle.

According to a further of the present disclosure, there is provided a frequency modulated continuous wave radar system comprising:
a radar transmission antenna;
a radar reception antenna; and
a data acquisition apparatus of the kind set out above.

According to another of the present disclosure, there is provided a road vehicle comprising a frequency modulated continuous wave radar system of the kind set out above.

Embodiments of this disclosure may use radar frequencies typically in the range of, hut not necessarily limited to, 76 GHz≤f≤81 GHz.

BRIEF DESCRIPTION OF THE DRAWINGS

Embodiments of this disclosure will be described hereinafter, by way of example only, with reference to the accompanying drawings in which like reference signs relate to like elements and in which:

FIG. 10 schematically illustrates the sampling and the collection of sampling data from a plurality of ramping regions in accordance with a further embodiment of the present disclosure; and FIG. 11 schematically illustrates the sampling of a plurality of ramping regions in accordance with another embodiment of the present disclosure.

DETAILED DESCRIPTION

Embodiments of this disclosure are described in the following with reference to the accompanying drawings.

Figure 1:
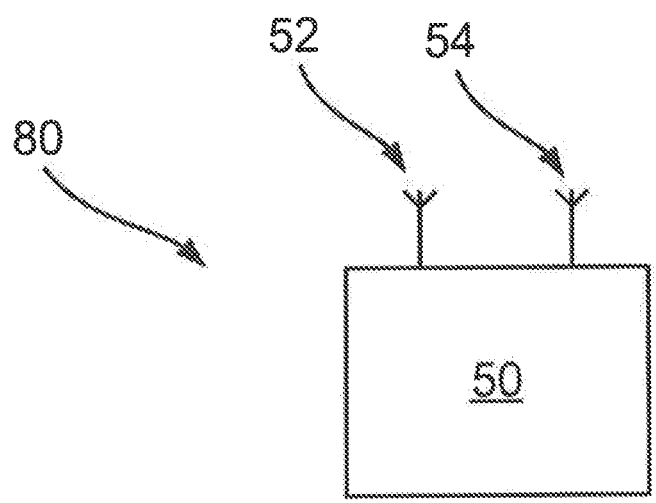
FIG. 1 shows a FMCW radar system for use in a road vehicle in accordance with an embodiment of the present disclosure.

FIG. 1 shows a frequency modulated continuous wave (FMCW) radar system 80 according to an embodiment of this disclosure. The system 80 includes a data acquisition apparatus 50, which is to be described below in more detail. The system 80 also includes a radar transmission antenna 52 and a radar reception antenna 54.

Figure 2:
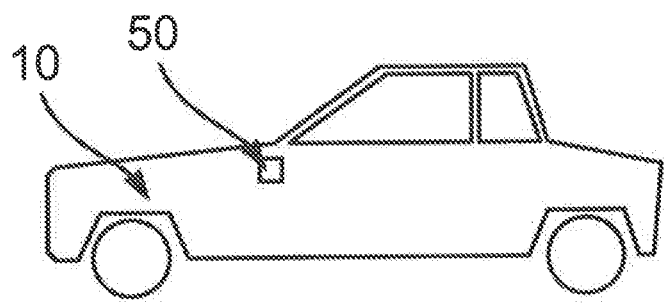
FIG. 2 shows a road vehicle including a FMCW radar system of the kind shown in FIG. 1, in accordance with an embodiment of the present disclosure.

FIG. 2 shows a road vehicle 10 including a FMCW radar system 80 of the kind shown in FIG. 1, in accordance with an embodiment of the present disclosure. The road vehicle may, for instance, be a car, van, truck, lorry, motor bike, or any other kind of road vehicle. As is known in the art, FMCW radar systems can be used to obtain information (e.g. distance information, velocity information) about objects located in the vicinity of a road vehicle incorporating the system. The objects may be stationary objects such as buildings or street furniture. The objects may typically also be other road vehicles. The other road vehicles may themselves also include an FMCW radar system.

Figure 3:
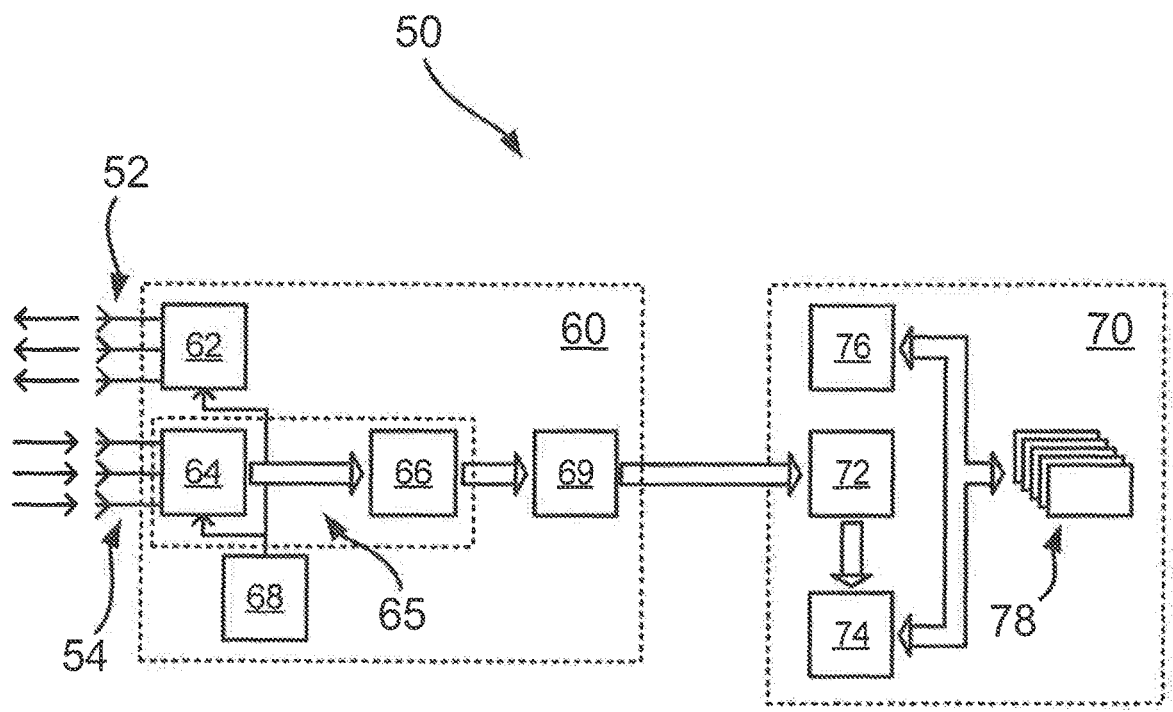
FIG. 3 shows a data acquisition apparatus for a system of the kind shown in FIG. 1, in accordance with an embodiment of the present disclosure.

FIG. 3 shows a data acquisition apparatus 50 for a system of the kind shown in FIG. 1, in accordance with an embodiment of the present disclosure.

The various components of the data acquisition apparatus 50 to be described below may be integrated into a single chip. It is also envisaged that one or more components of the data acquisition apparatus 50 may be provided in separate chips.

The data acquisition apparatus 50 in this embodiment includes a radar signal generation part 60 and a processing part 70.

The radar signal generation part 60 includes a receiver 64 and an analog to digital converter (ADC) 66. Collectively, the receiver 64 and the analog to digital converter 66 may form a sampler 65. Further detail about the sampling of a reflected signal received by the apparatus 50 will be described below.

The radar signal generation part 60 may also include a transmitter 62.

As shown in FIG. 3, the transmitter 62 and receiver 64 of the radar signal generation part 60 may be connected to the radar transmission antenna 52 and the radar reception antenna 54 of the FMCW radar system 80, respectively.

The transmitter 62 and the receiver 64 may both be connected to a high frequency oscillator 68 of the radar signal generation part 60. The high frequency oscillator 68 may, for instance, be a voltage controlled oscillator (VCO). The transmitter 62 and the receiver 64 may be operable to use a high frequency signal provided by the oscillator 6$ to form a frequency modulated radar signal for transmission and to demodulate a reflected signal received by the apparatus 50 for subsequent processing by the processing part 70.

The sampler 65 is operable to sample a reflected signal received by the apparatus 50. Typically, the reflected signal received by the apparatus 50 may correspond to the reflection of a radar signal, that has been transmitted by the system 80 (using the transmitter 62 and radar transmission antenna 52), from objects such as other road vehicles. After sampling, the sampled data is passed to a digital data transmission part 69, for transmission to the processing part 70.

The processing part 70 includes digital data reception part 72. The digital data reception part 72 is connected to the digital data transmission part 69 of the radar signal generation part 60, to receive the aforementioned sampled data therefrom. The processing part is operable to process the sampled data, thereby to extract the aforementioned information (distance, velocity, etc.) about objects located in the vicinity of the road vehicle, as mentioned above. The processing part 70 may include a processing hardware accelerator 74. The processing part 70 may also include a plurality of processing cores 78. The processing part 70 may further include a digital signal processor 76.

In a conventional FMCW radar system for use in a road vehicle, a radar signal is transmitted as a series of chirps, in which the frequency of the transmitted signal is modulated. The modulation of the frequency of the radar signal in this way can, for example, be used to provide velocity information about other road vehicles. After reflection of the frequency modulated radar signal from surrounding objects such as other road vehicles, the reflected signal may be received and processed.

Figure 4:
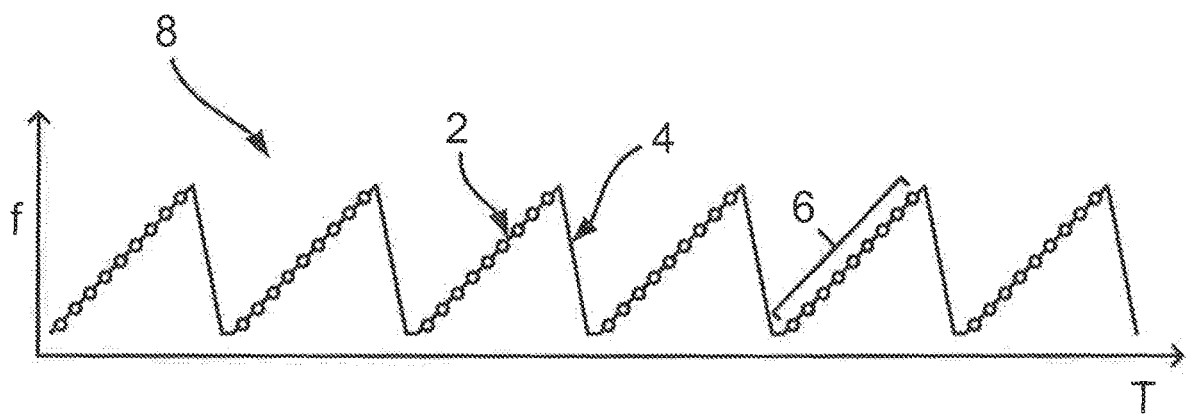
FIG. 4 schematically illustrates the sampling of a plurality of ramping regions.

An example of a reflected signal received by a conventional FMCW radar system is shown in FIG. 4. The reflected signal 8 typically includes a series of chirps, which correspond to the frequency modulated chirps of the transmitted signal. In this example, the frequency of the radar signal is modulated linearly as a function of time, resulting in a saw tooth line shape of the kind shown in the reflected signal of FIG. 4. The series of chirps of the reflected signal 8 include a first set of ramping regions 2 in which the frequency of the reflected signal ramps up, and a second set of ramping regions 4 in which the frequency of the reflected signal ramps down. The first ramping regions 2 may be interleaved with the second ramping regions 4 to produce the aforementioned saw tooth line shape.

The reflected signal may be sampled. Conventionally, this sampling takes place in the first set of ramping regions 2, i.e. while the frequency of the reflected signal ramps up. FIG. 4 shows that the sampling of the reflected signal may occur at a plurality of points 6 in each of the first ramping regions. After the frequency has ramped up in each first ramping region 2, the frequency generally ramps back down again in a following second ramping region 4, so that sampling may resume again in the next first ramping region 2 in the series.

As noted previously, conventional methods for the acquisition of chirp data in a FMCW radar system have high overhead time. This high overhead time is at least in part associated with the time taken for the frequency of the radar signal to ramp back down again (in the second ramping regions 4), to return to the start frequency, between two chirp data acquisitions.

Figure 5:
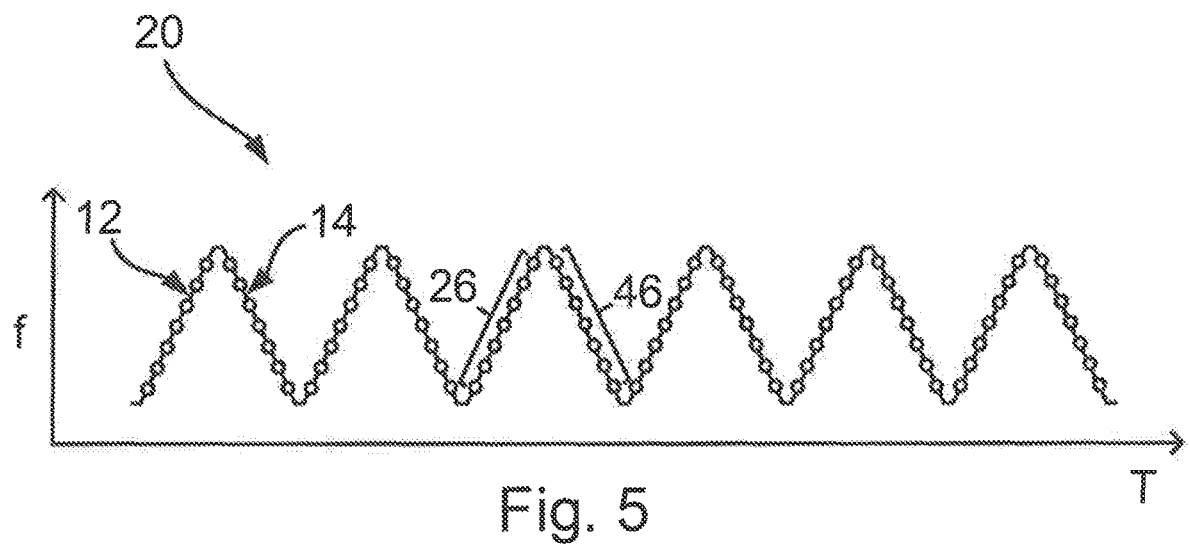
FIG. 5 schematically illustrates the sampling of a plurality of ramping regions in accordance with an embodiment of the present disclosure.

FIG. 5 schematically illustrates the sampling of a plurality of ramping regions in a reflected radar signal 20 in accordance with an embodiment of the present disclosure. The sampling may be performed by the sampler 65 described above.

The reflected radar signal 20 in FIG. 5 includes a series of chirps including a plurality of first ramping regions 12 in which a frequency of the frequency modulated continuous wave signal ramps up to a first frequency, and a plurality of second ramping regions 14 in which a frequency of the frequency modulated continuous wave signal ramps down to a second. As mentioned previously, and as shown in the example of FIG. 5, the ramping of the frequency in the ramping regions 12, 14 may take place between the first and the second frequencies. That is to say that in ramping regions 12 in which the frequency ramps up, the frequency may start at the second frequency and ramp up to the first frequency, whereas in ramping regions 14 in which the frequency ramps down, the frequency may start at the first frequency and ramp down to the second frequency. The first ramping regions 12 may be interleaved with the second ramping regions 14. As explained previously, the ramping regions 12, 14 may correspond to the ramping regions of a radar signal transmitted by the (FMCW) radar system 80, the radar signal having been reflected by one or more in objects located in the vicinity of a vehicle, and subsequently received by the radar reception antenna 54.

In this example, the ramping of the frequency in the ramping regions 12, 14 is substantially linear, giving rise to a saw tooth like line shape as a function of time. However, it is envisaged that other line shapes (e.g. sinusoidal) could be used. In this example, each ramping region is of the same duration. However, it is envisaged that the first ramping regions 12 may be longer than (or shorter than) the second ramping regions 14. In this example, the ramping rate (rate of change of frequency as a function of time) in each ramping region 12, 14 is substantially the same, although it is also envisaged that the rate in the first ramping regions 12 may be higher than (or lower than) the rate in the second regions 14.

In accordance with embodiments of this disclosure, the reflected radar signal 20 is sampled both in the first ramping regions 12, in which the frequency of the reflected signal 20 ramps up, and also in the second ramping regions 14, in which the frequency of the reflected signal 20 ramps down. In the example of FIG. 5, it is shown that a plurality of samples are taken at sampling points 26 in the first ramping regions 12 and that a plurality of samples are taken at sampling points 46 in the second ramping regions 14.

By sampling the reflected signal both in ramping regions in which the frequency of the reflected signal ramps up and in which the frequency of the reflected signal ramps down, chirp data may more swiftly be acquired by the data acquisition apparatus 50. The increase in acquisition speed may in turn enable, for example, faster radar update rates, improved range ambiguity resolution/noise removal, improved Doppler ambiguity resolution, redundancy for functional safety with two different detection matrices of different range and Doppler resolutions.

Figure 6:
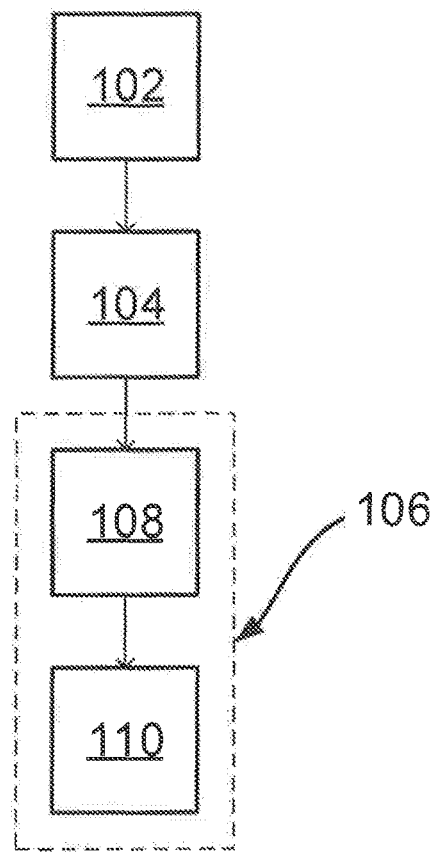
FIG. 6 illustrates a number of steps of a method of acquiring chirp data in a frequency modulated continuous wave (FMCW) radar system, in accordance with an embodiment of the present disclosure.

FIG. 6 illustrates a number of steps of a method of acquiring chirp data in a frequency modulated continuous wave (FMCW) radar system, in accordance with an embodiment of the present disclosure.

In a first step 102, a FMCW signal is transmitted. The signal may be generated by a transmitter 62 and high frequency oscillator 68 of a radar signal generation part 60 of the kind described in relation to FIG. 3. The generated signal may be transmitted using a radar transmission antenna 52 also of the kind described above. The transmitted FMCW signal includes a plurality of ramping regions in which a frequency of the frequency modulated continuous wave signal ramps up to a first frequency or ramps down to a second frequency.

In a next step 104, a reflected signal corresponding to the reflection of the FMCW signal from one or more physical objects (e.g. other road vehicles) is received. The signal may, for instance be received by a radar reception antenna 54 and receiver 64 of the kind described above. The reflected signal includes a plurality of ramping regions corresponding to the ramping regions of the transmitted frequency modulated continuous wave signal. An example of these ramping regions has been described in relation to FIG. 5; further examples will be described below.

In a next step 106, the reflected signal is sampled. The sampling 106 may be performed by a sampler 65 including a receiver 64 and ADC 66 of the kind described above. The sampling 106 may include one or more first sampling steps 108, in which a plurality of samples are taken in a ramping region in which the frequency of the reflected signal ramps up. The sampling 106 may include one or more second sampling steps 110, in which a plurality of samples are taken in a ramping region in which the frequency of the reflected signal ramps up. The first sampling steps 108 and second sampling steps 110 may alternate, so as to sample interleaved ramping regions 12, 14 of the reflected signal 20. The intervals (in time and/or frequency) between the sampling points in each ramping region may be substantially equal.

In the embodiment of FIG. 5, the sampling points 26, 46 in each ramping region are homogenous in the sense that each ramping region 12, 14 includes substantially the same number of sampling points 26, 46. However, it is also envisaged that, in accordance with embodiments of this disclosure, the sampling may differ according to the type of ramping region 12, 14 in the reflected signal 20. Examples of this are shown in FIGS. 7 and 8, which each schematically illustrate the sampling of a plurality of ramping regions 12, 14 in accordance with further embodiments of the present disclosure.

Figure 7:
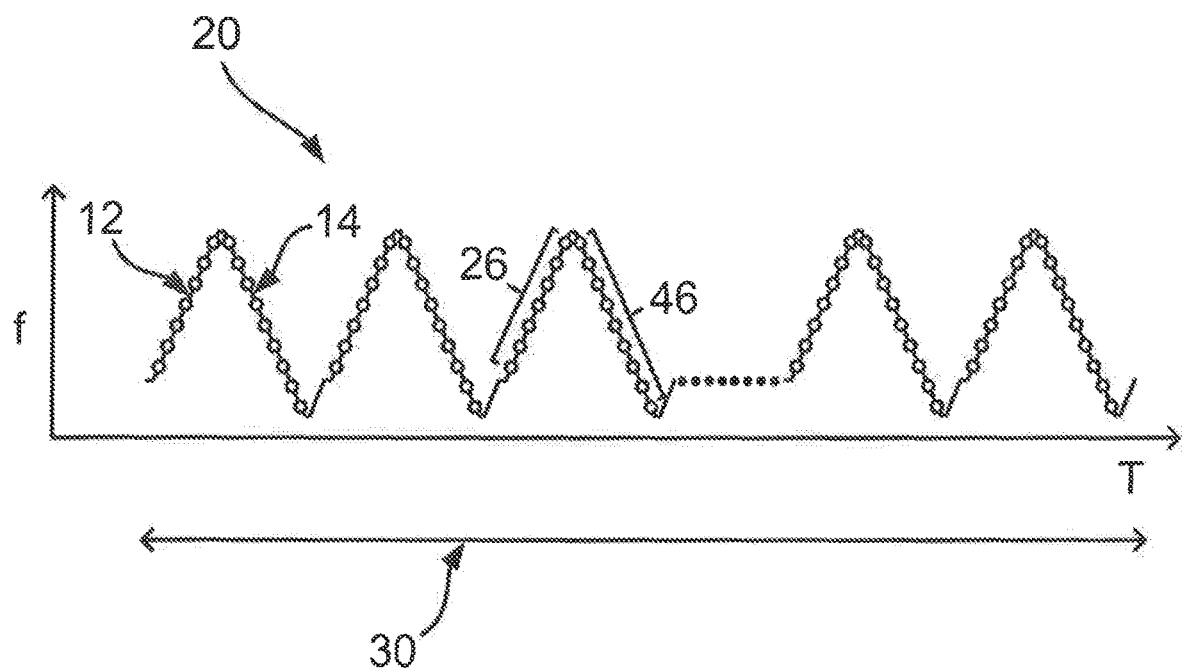
FIG. 7 schematically illustrates the sampling of a plurality of ramping regions in accordance with another embodiment of the present disclosure.
Figure 8:
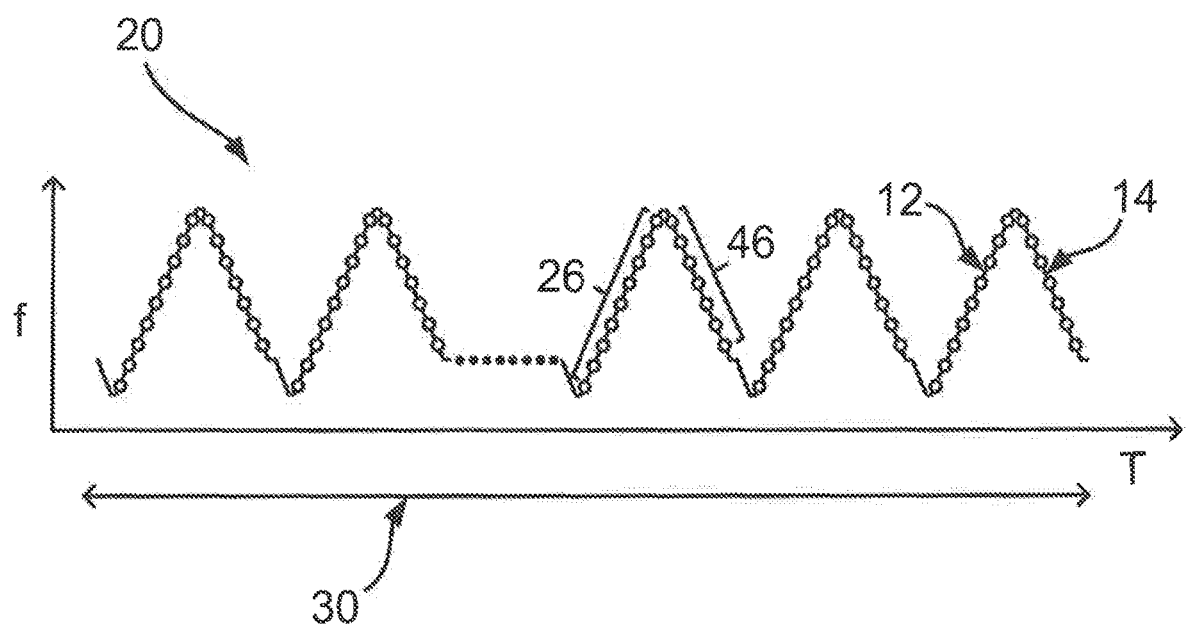
FIG. 8 schematically illustrates the sampling of a plurality of ramping regions in accordance with a further embodiment of the present disclosure.

In the example of FIG. 7, the number of sampling points 26 in each of the first ramping regions 12, in which the frequency ramps up, is fewer than the number of sampling points 46 in each of the second ramping regions 14, in which the frequency ramps down.

It is also envisaged that the number of sampling points 26 in each of the first ramping regions 12, in which the frequency ramps up, may be greater than the number of sampling points 46 in each of the second ramping regions 14, in which the frequency ramps down. This is shown in the example of FIG. 8.

As may be appreciated from FIGS. 7 and 6, by taking a greater number of samples in either the ramping regions 12 or the ramping regions 14, a degree of flexibility may be added to allow a larger amount of data to be acquired in either kind of ramping region 12, 14. For instance, this may allow for larger bandwidth in the ramping regions containing a larger number of sampling points 26, 46 (e.g. see FIG. 7, in which the sampling occurs over a larger frequency in the ramping regions 14 than in the ramping regions 12—the converse is true in FIG. 8), without a loss of resolution.

As will be described below in relation to FIGS. 9 and 10, the sampling data taken from the ramping regions 12 may be processed separately from the sampling data taken from the ramping regions 14. This may allow the differing number of sampling points according to ramping region type to be implemented in a manner that may not require any initial signal conditioning.

Figure 9:
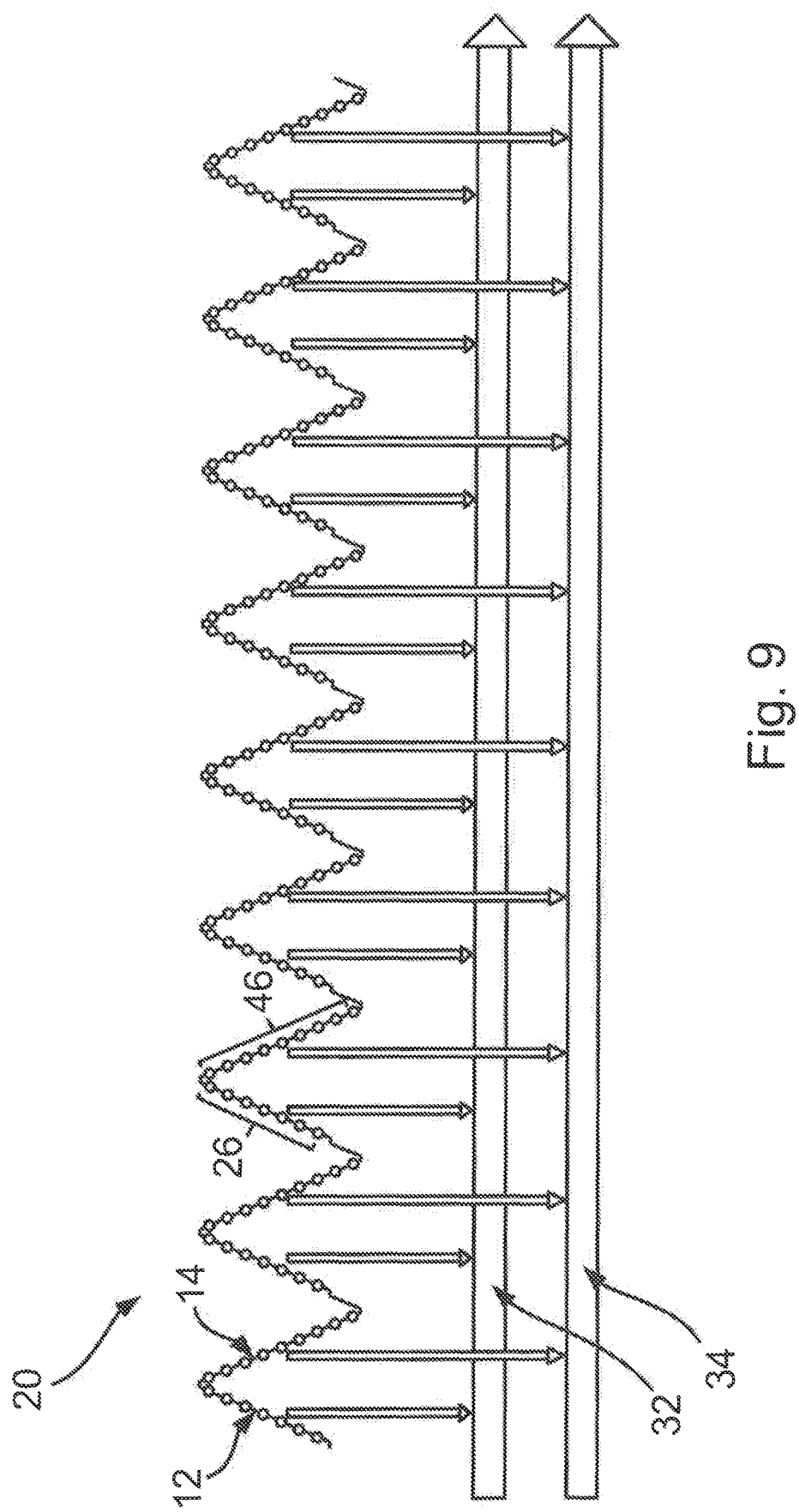
FIG. 9 schematically illustrates the sampling and the collection of sampling data from a plurality of ramping regions in accordance with another embodiment of the present disclosure.

FIG. 9 schematically illustrates the sampling and the collection of sampling data from a plurality of ramping regions 12, 14 of a reflected signal 20 in accordance with another embodiment of the present disclosure. In this embodiment, the sampled data may be conveyed for processing in one or more separate data streams 32, 34. These data streams 32, 24 may be provided in separate data paths of the data acquisition apparatus 50. A first of the data streams 32 may be used to convey sampling data taken from the first ramping regions 12, and a second of the data streams 34 may be used to convey sampling data taken from the second ramping regions 14. This approach may allow an increase in the quantity of sampling data associated with the taking of samples in both kinds of ramping region 12, 14 to be accommodated. This approach may also allow the data paths to be optimised according the type of sampling approach used in each respective ramping region 12, 14 (e.g. in terms of bandwidth, number of sampling points and the overall quantity of sampling data).

FIG. 10 schematically illustrates the sampling and the collection of sampling data from a plurality of ramping regions 12, 14 of a reflected signal 20 in accordance with a further embodiment of the present disclosure. In FIG. 10, the sampled data may be conveyed for processing in one or more separate data streams 32, 34 in much the same way as described above in relation to FIG. 9. However, in this embodiment, the inclusion in the second data stream 34 of data sampled in some of the ramping regions 14 is periodically skipped. In FIG. 10, it is shown that while all of the sampled data taken from the first ramping regions 12 is provided to the first data stream 32, the sampled data taken from every second ramping region 14 is not provided to the data stream 34 (this skipping events are represented in FIG. 10 by the arrows labelled 44). Although in FIG. 10, it is every second ramping region 14 that is skipped in this way, it is envisaged that the skipping frequency may be lower (e.g. every third, fourth, fifth ramping region 14 . . . etc. may be skipped), or higher (e.g. the sampling data of more ramping regions 14 may be skipped than are actually included to the data stream 34 (e.g. only every third, fourth, fifth ramping region 14 . . . etc. may be included)) than in FIG. 10.

It is also envisaged that instead of skipping the inclusion of sampling data from some of the ramping regions 14 in the data stream 34, the inclusion of sampling data from some of the ramping regions 12 in the data stream 32 may instead be skipped, in much the same way as described above. It is further envisaged that the inclusion of sampling data both from some of the ramping regions 12 and some of the ramping regions 14 may be skipped in this way.

The skipping of the inclusion of some of the sampling data in the data streams 32, 34 may introduce a different time gap between two consecutive ramping regions in which the reflected signal is sampled as it ramps up and two consecutive ramping regions in which the reflected signal is sampled as it ramps down. This can be used in a resolving ambiguous velocities.

FIG. 11 schematically illustrates the sampling of a plurality of ramping regions 12, 14 of a reflected signal 20 in accordance with another embodiment of the present disclosure. In this example, one or more of the ramping regions 13 of the ramping regions 12 (i.e. those ramping regions in which the frequency of the reflected signal ramps up) in a frame of the reflected signal 20 are not sampled. In this example, the ramping region(s) 13 that are not sampled may be located at the end of the frame. It is also envisaged that the ramping region(s) 13 that are not sampled may be located at the start of the frame.

It is also envisaged that the one or more ramping region(s) that are not sampled may be some of the ramping regions 14 (i.e. those ramping regions in which the frequency of the reflected signal ramps down) in a frame of the reflected signal 20. Again, the ramping region(s) 13 that are not sampled may be located at the start of the frame or at end of the frame.

By not sampling some of the ramping regions 12, 14, variability may be introduced in total frame length between ramping regions in which the frequency ramps up and ramping regions in which the frequency ramps down.

In FIGS. 9 to 11, the reflected signals 20 and the distribution of the sampling points 26, 46 in the ramping regions 12, 14 are similar to that shown in FIG. 7. In particular, FIGS. 9 to 11 employ a saw tooth like line shape for the reflected signal, with a greater number of sampling points 46 in the ramping regions 14 than there are sampling points 25 in the ramping regions 12. However, it will be appreciated that the principles explained in relation to FIGS. 9 to 11 could equally be applied in examples having other line shapes and/or distributions of sampling points.

Embodiments of this disclosure may use radar frequencies typically in the range of, but not necessarily limited to, 76 GHz≤f≤81 GHz.

Accordingly, there has been described a method and apparatus for acquiring chirp data in a frequency modulated continuous wave (FMCW) radar system of a road vehicle. The method includes transmitting a FMCW signal comprising a plurality of ramping regions in which a frequency of the FMCW signal ramps up to a first frequency or ramps down to a second frequency. The method also includes receiving a reflected signal corresponding to the reflection of the FMCW signal from one or more physical objects. The reflected signal includes a plurality of ramping regions corresponding to the ramping regions of the transmitted FMCW signal. The method further includes sampling the reflected signal by: taking a plurality of samples in a ramping region in which the frequency of the reflected signal ramps up; and taking a plurality of samples in a ramping region in which the frequency of the reflected signal ramps down.

Although particular embodiments of this disclosure have been described, it will be appreciated that many modifications/additions and/or substitutions may be made within the scope of the claims.

What is claimed is:

1. A method of acquiring chirp data in a frequency modulated continuous wave (FMCW) radar system of a road vehicle, the method comprising:
   transmitting a frequency modulated continuous wave signal comprising a plurality of ramping regions in which a frequency of the frequency modulated continuous wave signal ramps up to a first frequency or ramps down to a second frequency;
   receiving a reflected signal corresponding to the reflection of the frequency modulated continuous wave signal from one or more physical objects, wherein the reflected signal includes a plurality of ramping regions corresponding to the ramping regions of the transmitted frequency modulated continuous wave signal;
   sampling the reflected signal by:
      taking a plurality of samples in a ramping region in which the frequency of the reflected signal ramps up;
      taking a plurality of samples in a ramping region in which the frequency of the reflected signal ramps down; and
      taking a greater number of samples in the ramping region in which the frequency of the reflected signal ramps up than in the ramping region in which the frequency of the reflected signal ramps down, or taking a greater number of samples in the ramping region in which the frequency of the reflected signal ramps down than in the ramping region in which the frequency of the reflected signal ramps up.

2. The method of claim 1, wherein said sampling comprises:
   taking substantially the same number of samples in the ramping region in which the frequency of the reflected signal ramps up as in the ramping region in which the frequency of the reflected signal ramps down.

3. The method of claim 1 comprising:
   forming a first data stream comprising data sampled from a plurality of said ramping regions in which the frequency of the reflected signal ramps up; and
   forming a second data stream comprising data sampled from a plurality of said ramping regions in which the frequency of the reflected signal ramps down.

4. The method of claim 1 comprising:
   periodically skipping the inclusion in a first data stream of data sampled in a ramping region of the ramping regions in which the frequency of the reflected signal ramps up; and/or
   periodically skipping the inclusion in a second data stream of data sampled in a ramping region of the ramping regions in which the frequency of the reflected signal ramps down.

5. The method of claim 4 comprising applying a signal processing algorithm for resolving ambiguous velocities to the sampled data in the first data stream and the second data stream.

6. The method of claim 1 comprising sampling the reflected signal by:
   taking a plurality of samples in a plurality of ramping regions in which the frequency of the reflected signal ramps up;
   taking a plurality of samples in a plurality of ramping regions in which the frequency of the reflected signal ramps down; and
   not taking any samples in one or more ramping regions of the reflected signal in which the frequency of the reflected signal ramps up, or
   not taking any samples in one or more ramping regions of the reflected signal in which the frequency of the reflected signal ramps down.

7. The method of claim 6, in which the ramping regions in which samples are not taken are located at a start or at an end of a frame comprising a plurality of ramping regions.

8. The method of claim 1, wherein the physical objects comprise at least one other road vehicle.

9. A data acquisition apparatus for a frequency modulated continuous wave (FMCW) radar system of a road vehicle, the apparatus comprising:
   a receiver for receiving a reflected signal corresponding to the reflection of a transmitted frequency modulated continuous wave signal from one or more physical objects, wherein the reflected signal includes a plurality of ramping regions corresponding to ramping regions of the transmitted signal, wherein the ramping regions are regions in which a frequency of the frequency modulated continuous wave signal ramps up to a first frequency or ramps down to a second frequency; and
   a sampler configured to sample the reflected signal by:
      taking a plurality of samples in a ramping region of the reflected signal in which the frequency of the reflected signal ramps up;
      taking a plurality of samples in a ramping region of the reflected signal in which the frequency of the reflected signal ramps down; and
      taking a greater number of samples in the ramping region in which the frequency of the reflected signal ramps up than in the ramping region in which the frequency of the reflected signal ramps down, or taking a greater number of samples in the ramping region in which the frequency of the reflected signal ramps down than in the ramping region in which the frequency of the reflected signal ramps up.

10. The apparatus of claim 9, comprising:
    a first path for conveying a first data stream comprising data sampled from a plurality of said ramping regions in which the frequency of the reflected signal ramps up; and
    a second, different path for conveying a second data stream comprising data sampled from a plurality of said ramping regions in which the frequency of the reflected signal ramps down;

wherein the apparatus is configured:
  periodically to skip the inclusion in the first data stream of data sampled in a ramping region of the ramping regions in which the frequency of the reflected signal ramps up; and/or
  periodically to skip the inclusion in the second data stream of data sampled in a ramping region of the ramping regions in which the frequency of the reflected signal ramps down.

11. The apparatus of claim 9, wherein the sampler is configured to sample the reflected signal by:
  taking a plurality of samples in a plurality of ramping regions in which the frequency of the reflected signal ramps up;
  taking a plurality of samples in a plurality of ramping regions in which the frequency of the reflected signal ramps down; and
  not taking any samples in one or more ramping regions of the reflected signal in which the frequency of the reflected signal ramps up, or
  not taking any samples in one or more ramping regions of the reflected signal in which the frequency of the reflected signal ramps down.

12. A frequency modulated continuous wave radar system comprising:
  a radar transmission antenna;
  a radar reception antenna; and
  a data acquisition apparatus for a frequency modulated continuous wave (FMCW) radar system of a road vehicle, the apparatus comprising:
    a receiver for receiving a reflected signal corresponding to the reflection of a transmitted frequency modulated continuous wave signal from one or more physical objects, wherein the reflected signal includes a plurality of ramping regions corresponding to ramping regions of the transmitted signal, wherein the ramping regions are regions in which a frequency of the frequency modulated continuous wave signal ramps up to a first frequency or ramps down to a second frequency; and
    a sampler configured to sample the reflected signal by:
      taking a plurality of samples in a ramping region of the reflected signal in which the frequency of the reflected signal ramps up;
      taking a plurality of samples in a ramping region of the reflected signal in which the frequency of the reflected signal ramps down; and
      taking a greater number of samples in the ramping region in which the frequency of the reflected signal ramps up than in the ramping region in which the frequency of the reflected signal ramps down, or taking a greater number of samples in the ramping region in which the frequency of the reflected signal ramps down than in the ramping region in which the frequency of the reflected signal ramps up.

13. A road vehicle comprising the frequency modulated continuous wave radar system of claim 12.

14. The radar system of claim 12, wherein the sampler is configured to sample the reflected signal by:
  taking a plurality of samples in a plurality of ramping regions in which the frequency of the reflected signal ramps up;
  taking a plurality of samples in a plurality of ramping regions in which the frequency of the reflected signal ramps down; and
  not taking any samples in one or more ramping regions of the reflected signal in which the frequency of the reflected signal ramps up, or
  not taking any samples in one or more ramping regions of the reflected signal in which the frequency of the reflected signal ramps down.

15. The radar system of claim 14, wherein the ramping regions in which samples are not taken are located at a start or at an end of a frame comprising a plurality of ramping regions.

16. The radar system of claim 12, wherein the data acquisition apparatus further comprises:
  a first path for conveying a first data stream comprising data sampled from a plurality of said ramping regions in which the frequency of the reflected signal ramps up; and
  a second, different path for conveying a second data stream comprising data sampled from a plurality of said ramping regions in which the frequency of the reflected signal ramps down.

17. The radar system of claim 16, wherein the data acquisition apparatus is configured to:
  periodically to skip the inclusion in the first data stream of data sampled in a ramping region of the ramping regions in which the frequency of the reflected signal ramps up; and/or
  periodically to skip the inclusion in the second data stream of data sampled in a ramping region of the ramping regions in which the frequency of the reflected signal ramps down.

18. A method of acquiring chirp data in a frequency modulated continuous wave (FMCW) radar system of a road vehicle, the method comprising:
  transmitting a frequency modulated continuous wave signal comprising a plurality of ramping regions in which a frequency of the frequency modulated continuous wave signal ramps up to a first frequency or ramps down to a second frequency;
  receiving a reflected signal corresponding to the reflection of the frequency modulated continuous wave signal from one or more physical objects, wherein the reflected signal includes a plurality of ramping regions corresponding to the ramping regions of the transmitted frequency modulated continuous wave signal;
  sampling the reflected signal by:
    taking a plurality of samples in a ramping region in which the frequency of the reflected signal ramps up; and
    taking a plurality of samples in a ramping region in which the frequency of the reflected signal ramps down;
  periodically skipping the inclusion in a first data stream of data sampled in a ramping region of the ramping regions in which the frequency of the reflected signal ramps up; and/or
  periodically skipping the inclusion in a second data stream of data sampled in a ramping region of the ramping regions in which the frequency of the reflected signal ramps down.

19. The method of claim 18, wherein said sampling comprises:
  taking substantially the same number of samples in the ramping region in which the frequency of the reflected signal ramps up as in the ramping region in which the frequency of the reflected signal ramps down.

20. A data acquisition apparatus for a frequency modulated continuous wave (FMCW) radar system of a road vehicle, the apparatus comprising:
- a receiver for receiving a reflected signal corresponding to the reflection of a transmitted frequency modulated continuous wave signal from one or more physical objects, wherein the reflected signal includes a plurality of ramping regions corresponding to ramping regions of the transmitted signal, wherein the ramping regions are regions in which a frequency of the frequency modulated continuous wave signal ramps up to a first frequency or ramps down to a second frequency; and
- a sampler configured to sample the reflected signal by:
  - taking a plurality of samples in a ramping region of the reflected signal in which the frequency of the reflected signal ramps up; and
  - taking a plurality of samples in a ramping region of the reflected signal in which the frequency of the reflected signal ramps down;
- a first path for conveying a first data stream comprising data sampled from a plurality of said ramping regions in which the frequency of the reflected signal ramps up; and
- a second, different path for conveying a second data stream comprising data sampled from a plurality of said ramping regions in which the frequency of the reflected signal ramps down;
- wherein the apparatus is configured:
  - periodically to skip the inclusion in the first data stream of data sampled in a ramping region of the ramping regions in which the frequency of the reflected signal ramps up; and/or
  - periodically to skip the inclusion in the second data stream of data sampled in a ramping region of the ramping regions in which the frequency of the reflected signal ramps down.

* * * * *